United States Patent
Lee et al.

(10) Patent No.: US 8,817,160 B2
(45) Date of Patent: Aug. 26, 2014

(54) MOBILE TERMINAL AND METHOD OF CONTROLLING THE SAME

(75) Inventors: Choonggun Lee, Seoul (KR); Seobkeun Lee, Seoul (KR); Jongseok Park, Seoul (KR)

(73) Assignee: LG Electronics Inc., Seoul (KR)

( * ) Notice: Subject to any disclaimer, the term of this patent is extended or adjusted under 35 U.S.C. 154(b) by 243 days.

(21) Appl. No.: 13/532,696

(22) Filed: Jun. 25, 2012

(65) Prior Publication Data

US 2013/0050519 A1 Feb. 28, 2013

(30) Foreign Application Priority Data

Aug. 23, 2011 (KR) ........................ 10-2011-0083757

(51) Int. Cl.
| | | |
|---|---|---|
| H04N 5/222 | (2006.01) | |
| H04N 13/02 | (2006.01) | |
| H04N 5/228 | (2006.01) | |
| H04N 5/262 | (2006.01) | |
| G06K 9/40 | (2006.01) | |
| G03B 35/00 | (2006.01) | |

(52) U.S. Cl.
USPC ............... 348/333.04; 348/46; 348/208.1; 348/222.1; 348/239; 348/333.02; 382/254; 382/255; 396/324; 396/325

(58) Field of Classification Search
USPC ........ 348/42–60, 208.99–208.16, 222.1, 239, 348/241, 333.01–333.13; 382/254–275; 396/322–340
See application file for complete search history.

(56) References Cited

U.S. PATENT DOCUMENTS

| | | | |
|---|---|---|---|
| 7,301,563 B1* | 11/2007 | Kakinuma et al. | 348/208.13 |
| 7,349,119 B2* | 3/2008 | Tsukioka | 358/1.18 |
| 7,620,314 B2* | 11/2009 | Hamamura | 396/222 |
| 8,045,792 B2* | 10/2011 | Koo et al. | 382/154 |
| 8,115,818 B2* | 2/2012 | Sawada | 348/208.13 |
| 8,340,464 B2* | 12/2012 | Watanabe et al. | 382/284 |
| 8,483,452 B2* | 7/2013 | Ueda et al. | 382/118 |
| 8,508,619 B2* | 8/2013 | Oh et al. | 348/229.1 |
| 8,547,449 B2* | 10/2013 | Imamura | 348/222.1 |
| 2002/0154829 A1* | 10/2002 | Tsukioka | 382/254 |
| 2003/0095192 A1* | 5/2003 | Horiuchi | 348/222.1 |
| 2003/0133035 A1* | 7/2003 | Hatano | 348/362 |
| 2004/0125220 A1* | 7/2004 | Fukuda et al. | 348/234 |
| 2005/0219642 A1* | 10/2005 | Yachida et al. | 358/448 |
| 2006/0007327 A1* | 1/2006 | Nakamura et al. | 348/239 |
| 2006/0114331 A1* | 6/2006 | Tamamura | 348/208.13 |
| 2006/0115297 A1* | 6/2006 | Nakamaru | 399/163 |
| 2006/0132612 A1* | 6/2006 | Kawahara | 348/208.6 |
| 2006/0140510 A1* | 6/2006 | Wallace et al. | 382/294 |
| 2006/0215903 A1* | 9/2006 | Nishiyama | 382/154 |
| 2006/0238621 A1* | 10/2006 | Okubo et al. | 348/208.99 |
| 2006/0250515 A1* | 11/2006 | Koseki et al. | 348/362 |

(Continued)

OTHER PUBLICATIONS

European Patent Office Application Serial Number 12179802.9, Search Report dated Aug. 28, 2013, 8 pages.

*Primary Examiner* — Michael Osinski
(74) *Attorney, Agent, or Firm* — Lee, Hong, Degerman, Kang & Waimey

(57) ABSTRACT

A mobile terminal and a method of controlling the same are provided. The mobile terminal detects an object in which a ghost may appear through a preview image of an image acquired using a dual camera. The mobile terminal may display an indicator for identifying the detected object. Accordingly, a higher quality high dynamic range (HDR) image can be more efficiently acquired.

20 Claims, 16 Drawing Sheets

(56) References Cited

U.S. PATENT DOCUMENTS

| | | | |
|---|---|---|---|
| 2007/0025723 A1 | 2/2007 | Baudisch et al. | |
| 2007/0046809 A1* | 3/2007 | Nakamura | 348/362 |
| 2007/0098381 A1* | 5/2007 | Oshima | 396/52 |
| 2007/0120997 A1* | 5/2007 | Sasaki et al. | 348/362 |
| 2007/0229698 A1* | 10/2007 | Kakinuma et al. | 348/362 |
| 2007/0242900 A1* | 10/2007 | Chen et al. | 382/294 |
| 2007/0285521 A1* | 12/2007 | Watanabe et al. | 348/208.99 |
| 2007/0291114 A1* | 12/2007 | Oshima | 348/126 |
| 2008/0055683 A1* | 3/2008 | Choe et al. | 358/525 |
| 2008/0112616 A1* | 5/2008 | Koo et al. | 382/171 |
| 2008/0187234 A1* | 8/2008 | Watanabe et al. | 382/254 |
| 2008/0199070 A1* | 8/2008 | Kim et al. | 382/154 |
| 2008/0218613 A1 | 9/2008 | Janson et al. | |
| 2009/0256947 A1* | 10/2009 | Ciurea et al. | 348/333.12 |
| 2009/0262218 A1* | 10/2009 | Makii | 348/239 |
| 2009/0274387 A1* | 11/2009 | Jin | 382/274 |
| 2010/0020160 A1* | 1/2010 | Ashbey | 348/43 |
| 2010/0134652 A1 | 6/2010 | Takane | |
| 2010/0157078 A1* | 6/2010 | Atanassov et al. | 348/222.1 |
| 2010/0194903 A1* | 8/2010 | Kawashima | 348/222.1 |
| 2010/0245604 A1* | 9/2010 | Ohmiya et al. | 348/208.99 |
| 2010/0271498 A1* | 10/2010 | Hwang et al. | 348/222.1 |
| 2010/0271501 A1* | 10/2010 | Ooishi | 348/222.1 |
| 2011/0043639 A1* | 2/2011 | Yokohata | 348/169 |
| 2011/0069205 A1* | 3/2011 | Kasai et al. | 348/239 |
| 2011/0096195 A1* | 4/2011 | Nagoya | 348/231.3 |
| 2011/0102548 A1 | 5/2011 | Kim et al. | |
| 2011/0128432 A1* | 6/2011 | Shiohara | 348/333.02 |
| 2012/0133769 A1* | 5/2012 | Nagamine et al. | 348/148 |
| 2012/0162473 A1* | 6/2012 | Cheng | 348/231.99 |
| 2012/0249830 A1* | 10/2012 | Tsubaki | 348/229.1 |
| 2012/0321203 A1* | 12/2012 | Yamashita | 382/224 |
| 2013/0010084 A1* | 1/2013 | Hatano | 348/47 |
| 2013/0016253 A1* | 1/2013 | Kobayashi | 348/239 |
| 2013/0022291 A1* | 1/2013 | Sumi | 382/284 |
| 2013/0088592 A1* | 4/2013 | Falomkin et al. | 348/143 |
| 2013/0120610 A1* | 5/2013 | Tsubaki | 348/229.1 |
| 2013/0182177 A1* | 7/2013 | Furlan | 348/362 |
| 2013/0188873 A1* | 7/2013 | Sasaki | 382/195 |

* cited by examiner

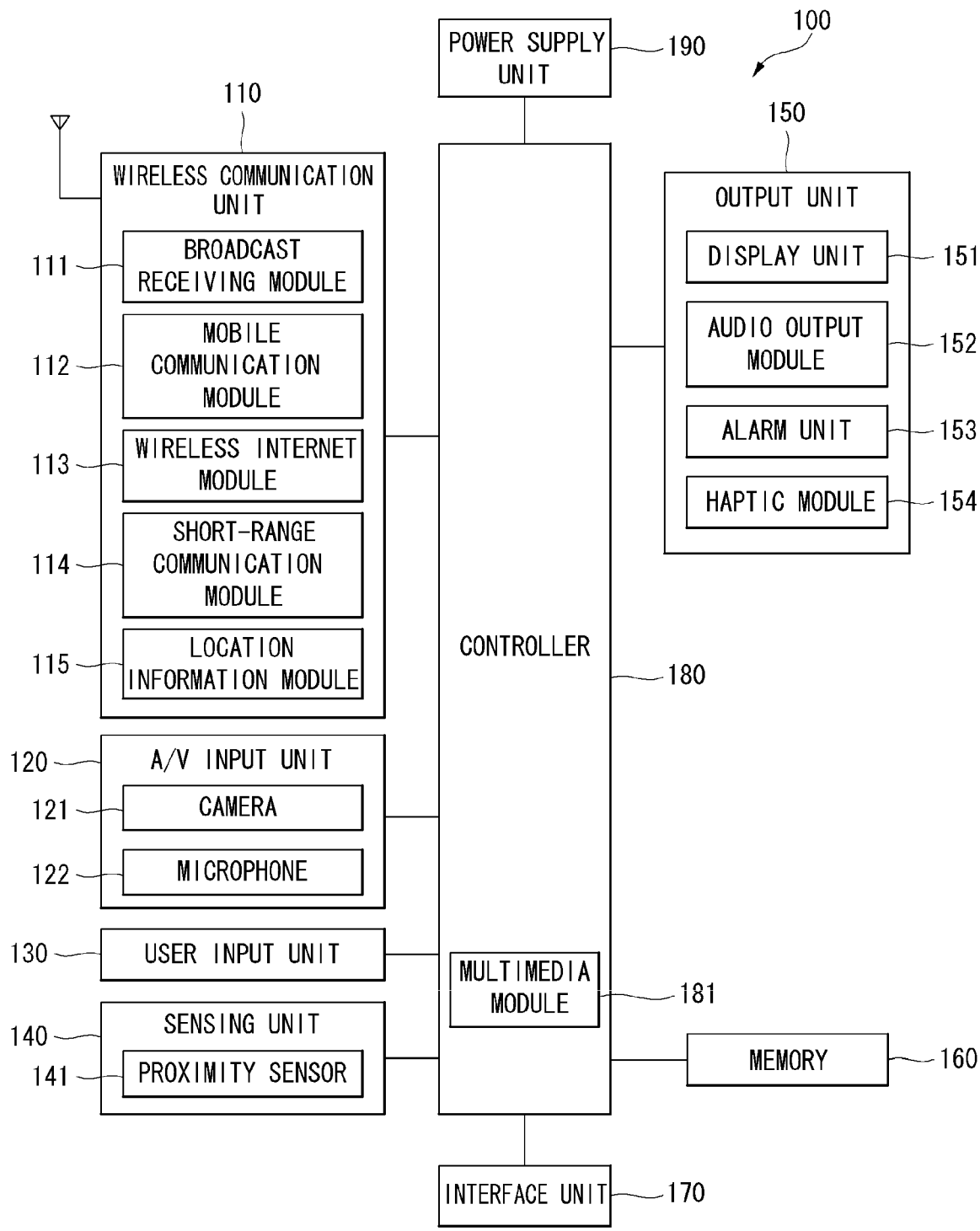

FIG. 10
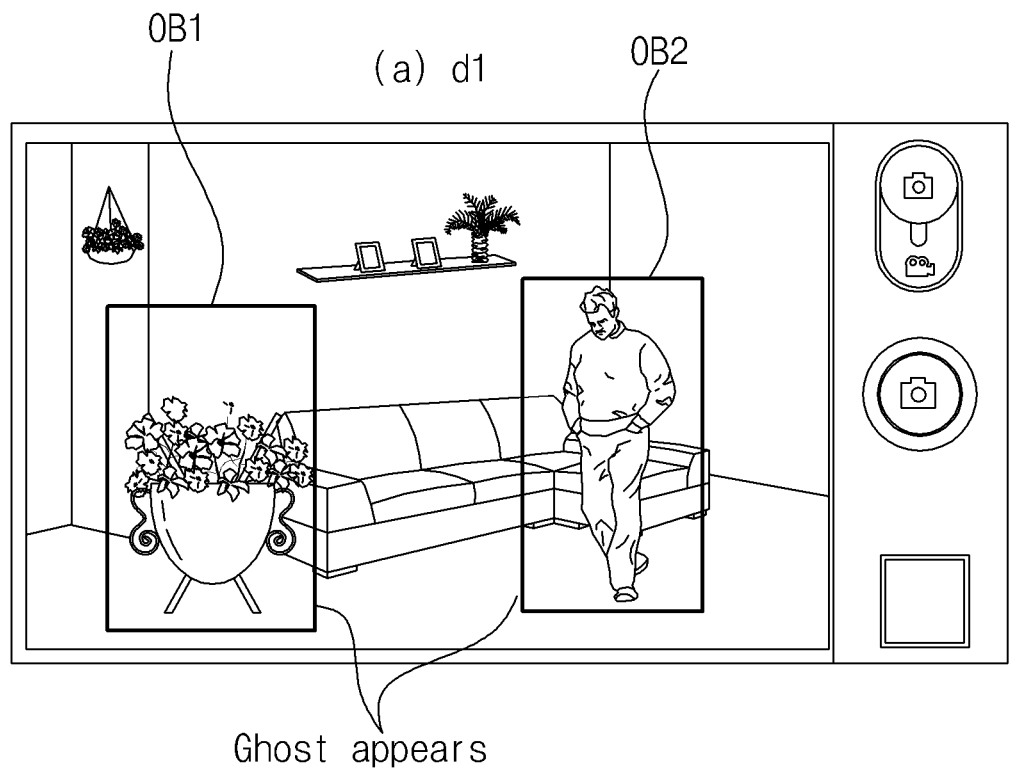
(a) d1
Ghost appears
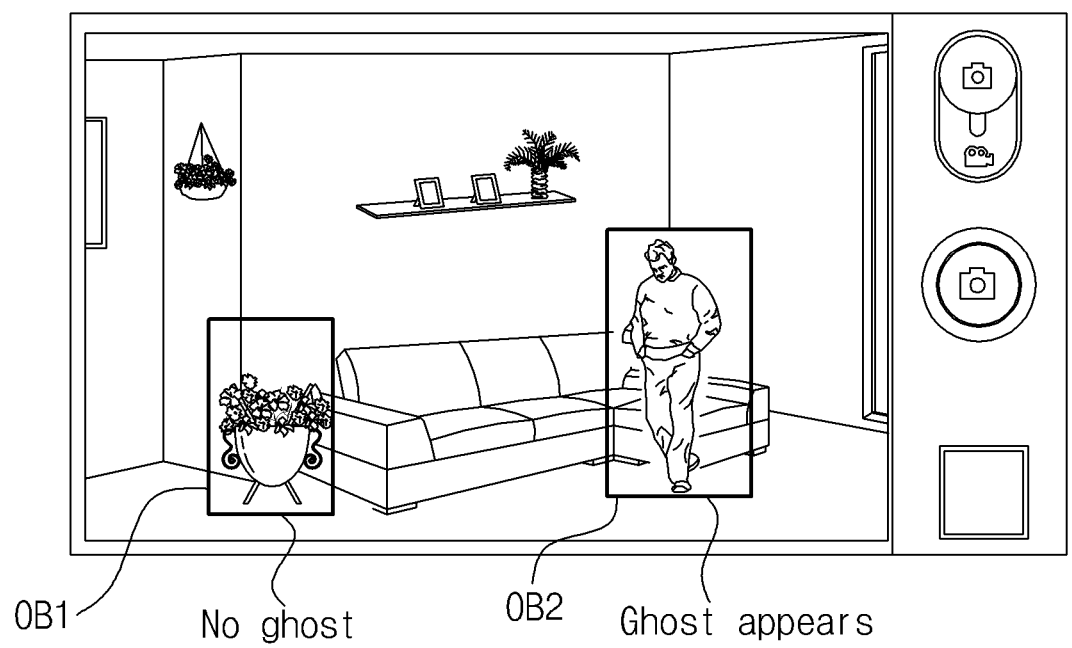
(b) d2
No ghost — Ghost appears

MOBILE TERMINAL AND METHOD OF CONTROLLING THE SAME

CROSS-REFERENCE TO RELATED APPLICATIONS

Pursuant to 35 U.S.C. §119(a), this application claims the benefit of earlier filing date and right of priority to Korean Patent Application No. 10-2011-0083757, filed on Aug. 23, 2011, the contents of which are hereby incorporated by reference herein in its entirety.

FIELD OF THE INVENTION

The present invention relates to a mobile terminal and a method of controlling the same.

RELATED ART

High dynamic range imaging (HDRI) is a digital image processing technique that can process a dynamic range (DR). HDRI was first developed to improve a quality of an image rendered by a computer. Thereafter, a method was developed to obtain a picture with a high DR from several pictures photographed in different exposure states.

When a high dynamic range (HDR) image is acquired using a single camera capturing two images with different exposure states, the following problems may occur due to a time interval between the capturing of the two images. First, either image may be shifted due to the shaking hands of the camera operator. Secondly, a difference in a position and a shape of a moving object may cause a faint image, sometimes called a "ghost," to appear in a captured image.

Technology that acquires and processes an HDR image in a mobile terminal environment can overcome these problems, as well as possess many other benefits, for mobile terminals and other image capturing devices.

SUMMARY

Among other things, the claimed invention provides a mobile terminal and a method of acquiring and processing an HDR image.

A mobile terminal can include: a display unit; a first camera configured to acquire a first image from a first view point; a second camera configured to acquire a second image from a second view point that is different from the first view point; and a controller configured to: determine whether high dynamic range (HDR) image processing is requested based on preview images of the first and second images, detect at least one object comprising a ghost in the preview images of the first or second images, and control the display unit to display an indicator corresponding to the detected at least one object.

The controller may switch a photographing mode to an HDR operating mode when the preview image of the first image includes at least one saturation area.

The controller may determine that a ghost appears based on a preview image of the first image and a preview image of a second image when the preview images of the first and second images are overlapped and a disparity exists between the preview images of the first and second images.

An indicator may include at least a highlight, a text or a voice message of the detected at least one object. The detected at least one object may exist in at least the preview image of the first image or the preview image of the second image.

The controller may provide information about a disparity between the detected at least one objects based on a distance between the mobile terminal and a selected at least one object.

The controller may provide a user selection menu. The user selection menu can be configured to enable capture and display of at least a video or an image, wherein the at least video or image may contain the aforementioned disparity.

The controller may re-detect the at least one object in which a ghost appears and provide an indicator corresponding to the re-detected at least one object.

The first camera may be set to capture an over-exposed image, and the second camera may be set to capture an under-exposed image.

A method of controlling a mobile terminal can include: acquiring a first image via a first camera from a first view point; acquiring a second image via a second camera from a second view point that is different from the first view point; entering a high dynamic range (HDR) operating mode; detecting at least one object comprising a ghost in the preview images of the first or second images; and displaying an indicator corresponding to the detected at least one object.

A method of controlling a mobile terminal can also include: analyzing a histogram distribution of a first area corresponding to the detected at least one object comprising a ghost in the first image; analyzing the histogram distribution of a second area located between the at least one object comprising the ghost in the second image and the proximate area relative to the second area; overlapping the first and the second images; shifting the detected at least one object from the second image to a corresponding area of the first image; and changing the histogram distribution of the first area with reference to the histogram distribution of the second area.

An HDR image can be acquired utilizing the apparatus or method of the claimed invention. When an image is acquired using a dual camera employing the apparatus or method of the claimed invention, even if the hands of the camera operator shake, the captured image will not appear shifted. Also, when images are acquired using a dual camera utilizing the apparatus or method of the claimed invention, even if a moving object changes its position or shape, a ghost does not appear in the captured image.

BRIEF DESCRIPTION OF THE DRAWINGS

The accompanying drawings show some embodiments of the claimed invention. The accompanying drawings are intended to be exemplary illustrations but are not intended to preclude alternative embodiments that are within the spirit and scope of the claimed invention.

FIG. 1 illustrates a block diagram of a mobile terminal according to an embodiment of the claimed invention.

FIG. 10 illustrates that a ghost may appear according to a distance between the mobile terminal and the subject.

DETAILED DESCRIPTION

Figure 2A:
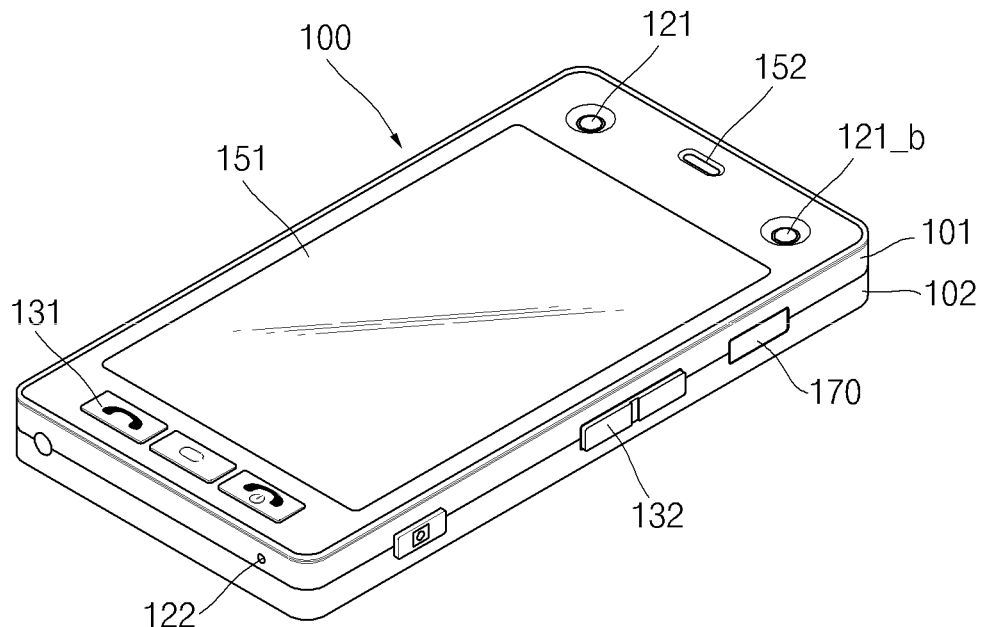
FIG. 2A illustrates a front perspective view of a mobile according to an embodiment of the claimed invention.

The claimed invention will now be described more fully with reference to the accompanying drawings. Embodiments of the claimed invention are not limited to the embodiments set forth herein. A mobile terminal relating to the claimed invention will be described below in more detail with reference to the accompanying drawing(s). In the following description, suffixes "module" and "unit" are given to components of the mobile terminal to facilitate description of the claimed invention.

The mobile terminal can include a cellular phone, a smart phone, a laptop computer, a digital broadcasting terminal, personal digital assistants (PDA), a portable multimedia player (PMP), a navigation system or other similar device.

FIG. 1 is a block diagram of a mobile terminal 100 according to an embodiment of the claimed invention. The mobile terminal can include at least a wireless communication unit 110, an A/V (Audio/Video) input unit 120, a user input unit 130, a sensing unit 140, an output unit 150, a memory 160, an interface unit 170, a controller 180 and a power supply unit 190. FIG. 1 shows the mobile terminal as having various components, but use of all these illustrated components is not required.

The wireless communication unit 110 can include one or more components allowing radio communication between the mobile terminal 100 and a wireless communication system or a network where the mobile terminal is located. For example, in FIG. 1, the wireless communication unit includes at least a broadcast receiving module 111, a mobile communication module 112, a wireless Internet module 113, a short-range communication module 114, or a location information module 115.

The broadcast receiving module 111 receives at least broadcast signals or broadcast associated information from an external broadcast management server via a broadcast channel. Further, the broadcast channel may include at least a satellite channel or a terrestrial channel. The broadcast management server may be (1) a server that generates and transmits at least a broadcast signal or broadcast associated information or (2) a server that receives at least a previously generated broadcast signal or broadcast associated information and transmits the same to a terminal. The broadcast signal can include a TV broadcast signal, a radio broadcast signal, a data broadcast signal or any other similar signal. Also, the broadcast signal can further include a broadcast signal combined with a TV or radio broadcast signal.

The broadcast associated information may refer to information associated with at least a broadcast channel, a broadcast program or a broadcast service provider. The broadcast associated information may be provided via a mobile communication network, and the broadcast associated information may be received by the mobile communication module 112.

The broadcast signal may exist in various forms; for example, the broadcast signal can exist in a form of an electronic program guide (EPG) of the digital multimedia broadcasting (DMB) system, an electronic service guide (ESG) of the digital video broadcast-handheld (DVB-H) system, or other similar forms.

The broadcast receiving module 111 may also be configured to receive signals broadcast using various types of broadcast systems. For example, the digital broadcast system can be a multimedia broadcasting-terrestrial (DMB-T) system, a digital multimedia broadcasting-satellite (DMB-S) system, a digital video broadcast-handheld (DVB-H) system, a data broadcasting system known as the media forward link only (MediaFLO®), an integrated services digital broadcast-terrestrial (ISDB-T) system, or other similar system.

The broadcast receiving module 111 can also be configured to be compatible with all other broadcast systems that provide a broadcast signal. The broadcast signals or broadcast-associated information received via the broadcast receiving module may be stored in the memory 160.

The mobile communication module 112 can at least transmit radio signals to or receive radio signals from at least a base station, an external terminal or a server. Such radio signals can include at least a voice call signal, a video call signal, various types of data signals, or a multimedia message.

The wireless Internet module 113 supports wireless Internet access for the mobile terminal and can be internally or externally coupled to the mobile terminal. The wireless Internet access technique implemented can include a Wireless LAN (WLAN) Wireless Fidelity (Wi-Fi), Wireless broadband (Wibro), World Interoperability for Microwave Access (Wimax), High Speed Downlink Packet Access (HSDPA), or other the similar system.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, or other similar short-range communication technology.

The location information module 115 is a module for checking or acquiring a location or position of the mobile terminal. The location information module may acquire location information by using a Global Navigation Satellite System (GNSS). GNSS is a standard generic term for satellite navigation systems revolving around the Earth and allowing certain types of radio navigation receivers to transmit reference signals that determine their location on or in the vicinity of the surface of the Earth. GNSS may include the United States' Global Positioning System (GPS), the European Union's Galileo positioning system, the Russian Global Orbiting Navigational Satellite System (GLONASS), a Compass Navigation System (COMPASS) by the People's Republic of China, and the Quasi-Zenith Satellite System (QZSS) by Japan.

A GPS module may calculate information related to the distance between a point (or entity) to three or more satellites as well as information related to the time at which the distance information was measured. The GPS module can then apply trigonometric principles to the calculated distance to calculate three-dimensional location information including latitude, longitude, and altitude with respect to the point (or entity). Alternatively, a method of acquiring location and time information by using three satellites and correcting for any error of the calculated location and time information may be used. The GPS module can continuously calculate current location information of the point (or entity) in real time as well as calculate speed information using the continuously calculated current location information.

With reference to FIG. 1, the A/V input unit 120 is configured to receive at least an audio or a video signal. The NV unit can include at least a camera 121 or a microphone 122. The camera 121 can process image data of at least still pictures or video data obtained by an image capture device in a video capturing mode or an image capturing mode. The A/V unit can also process image frames that can be displayed on a display unit 151.

Image frames processed by the camera 121 can be stored in the memory 160 or transmitted elsewhere via the wireless communication unit 110. The mobile terminal 100 can comprise two or more cameras 121.

The microphone 122 can receive sounds while in at least a phone call mode, a recording mode, a voice recognition mode, or a similar mode. The microphone can also process such sounds into audio data. The processed audio data may then be converted for output as a format transmittable to a mobile communication base station. Transmission of the converted output can occur via the mobile communication module 112 during the phone call mode. The microphone can also implement various types of noise canceling (or suppression) algorithms to cancel or suppress noise or other auditory interference when receiving or transmitting the audio signals.

The user input unit 130 can generate input data from commands entered by a user to control various operations of the mobile terminal 100. The user input unit can include at least a keypad, a dome switch, a touch pad (e.g., a touch-sensitive member that detects changes in resistance, pressure, or capacitance resulting from a contact), a jog wheel, a jog switch, or other similar component.

The sensing unit 140 detects a current status of the mobile terminal 100, such as an opened or closed state of the mobile terminal, a location of the mobile terminal, a presence or absence of user contact with the mobile terminal, the orientation of the mobile terminal, an acceleration or deceleration of movement or direction of movement of the mobile terminal, and other similar information about the mobile terminal.

The sensing unit 140 can also generate commands or signals for controlling the operation of the mobile terminal 100. For example, when the mobile terminal is implemented as a slide-type phone, the sensing unit may sense whether the slide-type component has been slid open or slid closed. The sensing unit can also detect whether or not the power supply unit 190 supplies power. The sensing unit can also detect whether the interface unit 170 is coupled to an external device. In FIG. 1, the sensing unit is illustrated as including a proximity sensor 141.

The output unit 150 is configured to provide outputs in at least a visual, audible or tactile manner. In FIG. 1, the output unit can include the display unit 151, an audio output module 152, an alarm unit 153, a haptic module 154, and other related modules. The display unit 151 can display information processed in the mobile terminal 100. For example, when the mobile terminal is set to a phone call mode, the display unit can display a User Interface (UI) or a Graphic User Interface (GUI) associated with a call.

The display unit 151 can also include at least a Liquid Crystal Display (LCD), a Thin Film Transistor-LCD (TFT-LCD) display, an Organic Light Emitting Diode (OLED) display, a flexible display, a three-dimensional (3D) display, or other similar display. Some displays can also be configured as transparent or light-transmissive. An example transparent display is a TOLED (Transparent Organic Light Emitting Diode) display. A rear structure of the display unit may be also light-transmissive. As a result, the user can view an object positioned at a rear side of the terminal body through a region occupied by the display unit of the terminal body.

In some embodiments of the claimed invention, the mobile terminal 100 can include two or more display units 151. For example, a plurality of display units can be separately or integrally disposed on one surface of the mobile terminal. Alternatively, the plurality of display units can be separately disposed on mutually different surfaces.

When the display unit 151 and a sensor (also referred to as a 'touch sensor') for detecting a touch operation are overlaid in each other, the display unit can function as both an input device and an output device. The touch sensor can have at least a form of a touch film, a touch sheet, a touch pad or other touch component.

The touch sensor can be configured to convert pressure applied to a particular portion of the display unit 151, a change in the capacitance, or other change generated at a particular portion of the display unit into an electrical input signal. The touch sensor can also be configured to detect the pressure, position and area of a touch.

When there is a touch input with respect to the touch sensor, corresponding signals are transmitted to a touch controller, and the touch controller processes the signals and transmits corresponding data to the controller 180. Accordingly, the controller can recognize which portion of the display unit 151 has been touched.

With reference to FIG. 1, the proximity sensor 141 may be located within or near the touch screen. The proximity sensor can be a sensor for detecting the presence or absence of an object relative to a certain detection surface. The proximity sensor can also be a sensor for detecting an object that exists nearby using electromagnetism forces or infrared rays. The proximity sensor has a considerably longer life span as compared to a contact-type sensor.

Examples of the proximity sensor 141 can include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, or other similar sensor. When the touch screen is set to detect changes to capacitance, a proximity of the pointer is detected by a change in an electric field according to the proximity of the pointer relative to the touch screen. Such a sensor may be called a proximity sensor.

In the following description, recognition of a pointer positioned close to the touch screen will be called a 'proximity touch,' while recognition of actual contacting of the pointer to the touch screen will be called a 'contact touch.' Further, when the sensor is set to detect a proximity touch, the pointer is positioned to correspond vertically to the touch screen.

By using the proximity sensor 141, a proximity touch and a proximity touch pattern (e.g., a proximity touch distance, a proximity touch speed, a proximity touch time, a proximity touch position, a proximity touch movement state, or other similar state) can be detected. Information corresponding to a proximity touch operation and the proximity touch pattern can be displayed on the display unit 151.

The audio output module 152 can convert audio signals into audio data and, subsequently, output the audio data via the wireless communication unit or store the audio data in the memory 160. The audio output module can perform these functions while the mobile terminal 100 is in a call signal reception mode, a call mode, a record mode, a voice recognition mode, a broadcast reception mode, or other similar mode. The audio output module can provide audible outputs (e.g., a call signal reception sound, a message reception sound, or other similar sound) related to a particular function performed by the mobile terminal. The audio output module can also include a speaker, a buzzer or other similar component. Also, the audio output module can output sounds through an earphone jack.

The alarm unit 153 can output information about the occurrence of an event related to the mobile terminal 100. Typical events can include call reception, message reception, key signal inputs, a touch input, or any other event associated with the mobile terminal. The audio signal may also be output through the display unit 151 or the audio output module 152. The alarm unit can also provide an output in the form of a vibration or a video signal.

The haptic module 154 generates various tactile effects the user may feel. One example of the tactile effects generated by the haptic module 154 is vibration. The strength and pattern of the haptic module 154 can also be controlled. For example, different vibrations can be combined, intermittent or sequential.

The haptic module 154 can also generate various other tactile effects. One example is a stimulation from a pin arrangement vertically moving with respect to a contact skin. Another example is an air spray force through a jet orifice or air suction force through a suction opening. Other examples include a contact on a skin, a contact of an electrode on the skin, an electrostatic force on the skin, stimulating a sense of cold or warmth, and other similar forms of tactile stimulation.

The haptic module 154 may also allow a user to feel a tactile effect through a sensation onto a part of a finger, hand or arm of the user. The haptic module may also transfer the tactile effect through a direct contact. In an alternative embodiment, two or more haptic modules may be provided in the mobile terminal 100.

The memory 160 can store software programs used for the processing and controlling operations performed by the controller 180. Alternatively, the memory can temporarily store data (e.g., a phonebook, messages, still images, a video, or other similar data) that are input in or output from the mobile terminal. In addition, the memory 160 may store data regarding various patterns of vibrations and audio signals output when a touch is input to the touch screen.

The memory 160 may also include at least a flash memory, a hard disk, a multimedia card micro type, a card-type memory (e.g., a Secure Digital (SD) or DX memory), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, or an optical disk. Also, the mobile terminal 100 may operate in relation to a web storage device that performs the storage function of the memory via the Internet.

The interface unit 170 serves as an interface with external devices connected with the mobile terminal 100. For example, the external devices can transmit data to an external device, receive and transmit power to each element of the mobile terminal, or transmit internal data from the mobile terminal to an external device. For example, the interface unit may include at least wired or wireless headset ports, external power supply ports, wired or wireless data ports, memory card ports, ports for connecting a device having an identification module, audio input/output (I/O) ports, video I/O ports, earphone ports, or other similar ports.

The identification module (not shown) can be a chip that stores various types of information for authenticating a particular mobile terminal 100. The identification module can include at least a User Identity Module (UIM), a Subscriber Identity Module (SIM), a Universal Subscriber Identity Module (USIM), or other similar module. A device having the identification module (also referred to as an 'identifying device') may take the form of a smart card. Accordingly, the identifying device can be connected with the mobile terminal via a port.

When the mobile terminal 100 is connected with an external cradle (not shown), the interface unit 170 can allow power from the cradle to be supplied to the mobile terminal 100 or allow command signals input to the cradle by the user to transfer to the mobile terminal. Command signals or power input from the cradle can operate as signals for recognizing that the mobile terminal is properly mounted on the cradle.

The controller 180 controls the general operations of the mobile terminal. The controller can perform controlling and processing associated with voice calls, data communications, video calls, and the similar functions. In the example in FIG. 1, the controller also includes a multimedia module 181 for reproducing multimedia data. The multimedia module can be configured in association with the controller or can be configured to be separated from the controller. The controller 180 can perform a pattern recognition processing to recognize a handwriting or a picture drawing input on the touch screen.

The power supply unit 190 receives external power or internal power and supplies the power required for operating the parts of the controller 180. Various embodiments described herein may be implemented in a computer-readable, or similar, medium using, for example, software, hardware, or any combination thereof.

In hardware implementation, the embodiments described herein may be implemented by using at least Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, or other electronic units designed to perform the functions described herein. In some embodiments, the claimed invention can be implemented by only the controller 180.

In software implementation, the procedures or functions described herein may be implemented by separate software modules. Each software module may perform one or more function or operation described herein. Software codes can be implemented by a software application written in any suitable programming language. The software codes may be stored in the memory 160 and executed by the controller 180.

FIG. 2A is a front perspective view of a mobile terminal 100 or a handheld terminal according to an embodiment of the claimed invention.

The mobile terminal 100 can have a bar-type terminal body. However, the claimed invention is not limited to a bar-type terminal and can include a slide-type terminal body, a folder-type terminal body, a swing-type terminal body or a swivel-type terminal body having at least two bodies that are movably combined.

The terminal body includes a case (e.g., a casing, a housing, a cover or other similar exterior layer) forming the exterior of the mobile terminal 100. In the present embodiment, the case can be divided into a front case 101 and a rear case 102. Various electronic components are arranged in the space formed between the front case and the rear case. At least one middle case can be additionally arranged between the front case and the rear case.

The cases can be formed of plastics made by injection molding or made of metal materials like stainless steel (STS) or titanium (Ti).

The display unit 151, the audio output module 152, the camera 121, user input units 131 and 132, the microphone 122 and the interface 170 can be arranged in the terminal body 100. In one embodiment of the terminal body, these components are located in the front case 101.

The display unit 151 occupies most part of the main face of the front case 101. The audio output 152 and the camera 121 are arranged in a region that is in proximity to a first of two ends of the display unit. The user input unit 131 and the microphone 122 are located in a region in proximity to the second end of the two ends of the display unit. The user input unit 132 and the interface 170 are arranged on the sides of the front case 101 and the rear case 102.

The user input unit 131,132 can receive commands for controlling the operation of the handheld terminal 100. The user input unit can include a plurality of operating units 131 and 132. The operating units can be referred to as manipulating portions. A user can provide inputs to the operating units using a tactile manner or tactile feeling. First and second operating units may also receive other inputs. For example, the first operating unit can receive commands such as start, end and scroll. The second operating unit can receive commands that control the volume of sound output from the audio output module 152. Alternatively, the second operating unit can control the conversion of the display unit 151 to a touch recognition mode.

Figure 2B:
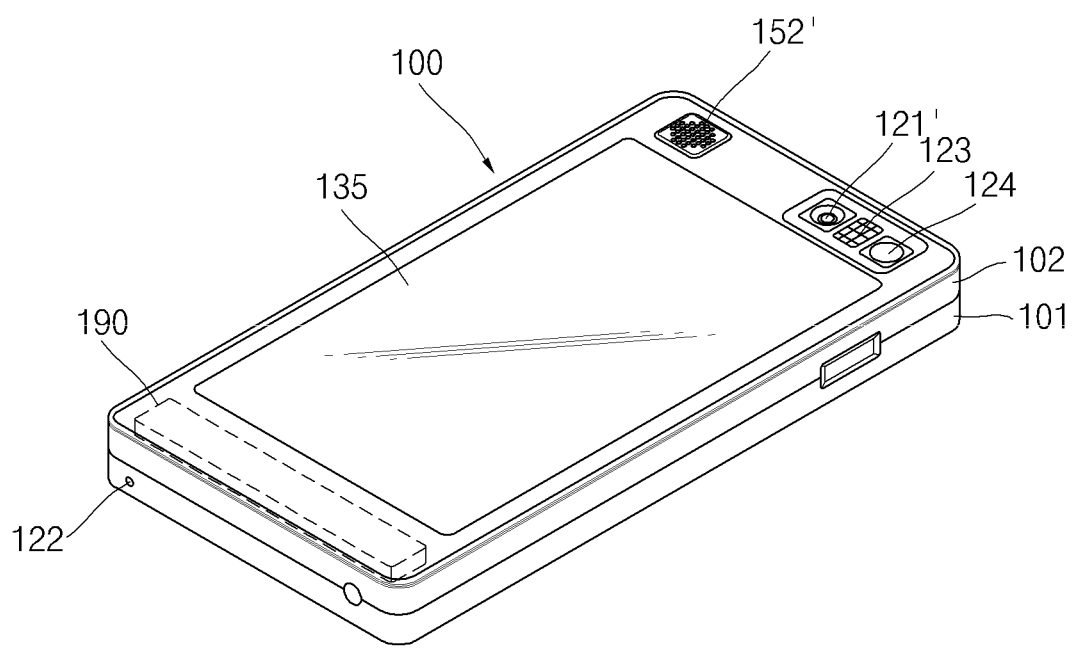
FIG. 2B illustrates a rear perspective view of the mobile terminal illustrated in FIG. 2A.

FIG. 2B is a rear perspective view of the mobile terminal 100 shown in FIG. 2A.

Referring to FIG. 2A, a camera 121' can be additionally attached to the rear case 102 located at the rear side of the terminal body. The camera can have a photographing direction opposite to that of the camera and can have a number of pixels different from those of the camera.

It may sometimes be desirable for the camera 121 to have a low number of pixels such that it can capture an image and quickly transmit the image to a receiving part. It may sometimes be desirable to for the camera to have a high number of pixels such that it can capture important details of an image. The cameras can be attached to the terminal body such that they can be rotated or popped upward.

A flash 123 and a mirror 124 may be arranged in proximity to the camera 121'. The flash can illuminate an object when the camera captures a picture of the object. The mirror can be used for the user to look at his/her own face in the mirror when the user wants to capture a picture of himself/herself using the camera.

An audio output module 152' can be additionally provided on the rear side of the terminal body. The audio output module 152' can achieve a stereo function with the audio output module 152, as shown in FIG. 2A. Alternatively, the audio output module can be used for a speaker phone mode when the mobile terminal 100 is used for a telephone call.

A broadcasting signal receiving antenna can be attached to the side of the terminal body. The broadcasting signal receiving antenna can be attached to the terminal body in addition to an antenna for telephone calls. The broadcasting signal receiving antenna can construct a part of the broadcasting receiving module 111, as shown in FIG. 1, and can be set in the terminal body such that the broadcasting signal receiving antenna can be pulled out of the terminal body.

The power supply unit 190 for providing power to the mobile terminal 100 is set in the terminal body. The power supply unit can be included in the terminal body or attached to and detached from the terminal body.

A touch pad 135 configured for sensing touch can be additionally attached to the rear case 102. The touch pad can be a light transmission variation of the display unit 151. If the display unit outputs visual information through both of its sides, the visual information can be recognized through the touch pad 135. The information output through both sides of the display unit 151 can be controlled by the touch pad. Alternatively, a display can be additionally attached to the touch pad such that a touch screen can be arranged at the rear case 102.

The touch pad 135 operates in connection with the display unit 151 of the front case 101. The touch pad 135 may be located behind and parallel to the display unit 151. The touch pad 135 may be identical to or smaller in size relative to the display unit 151.

Figure 3:
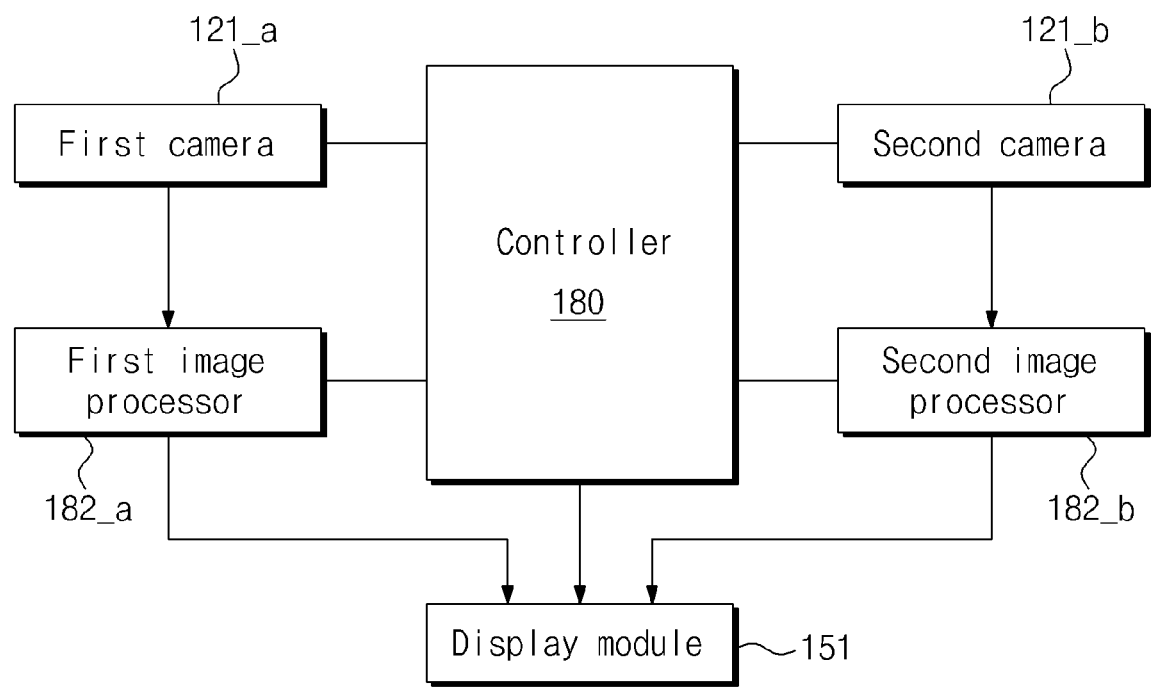
FIG. 3 illustrates a block diagram representing a method of controlling the mobile terminal illustrated in FIG. 1.

FIG. 3 illustrates a block diagram of a method of controlling the mobile terminal illustrated in FIG. 1.

Referring to FIG. 3, the mobile terminal 100 generates an HDR image using an image captured via a dual camera. The mobile terminal includes a first camera 121_a, a second camera 121_b, a first image processor 182_a, and a second image processor 182_b. Hereinafter, the operations related to the block configuration shown in FIG. 3 will be described.

The first camera 121_a and the second camera 121_b include a camera sensor (not shown) for capturing an image of a photographer or a subject. The camera sensor can convert the photographed light signal to an electrical signal. A signal processor (not shown) can convert an analog image signal to digital data.

The first and second image processors 182_a and 182_b can process images photographed by the first and second cameras 121_a and 121_b. The first and second image processors, however, perform a function of displaying a preview image of an image signal of the photographed subject. Further, the first and second image processors can process an image signal output from the first and second cameras per frame unit. The first and second image processors can then output the frame image data in such a way as to correspond to a characteristic and a size of the display unit 151.

The first and second image processors 182_a and 182_b can compress the frame image data. Further, the first and second image processors can perform synthesizing or editing of the frame image data using a method set by the control of the controller 180. Also, the first and second image processors can restore the compressed frame image data to the original frame image data. Frame image data may be output as on-screen display data according to the screen size displayed on the display unit by the controller.

The display unit 151 can display a preview state of an image output from the first and second image processors 182_a and 182_b or display a synthesized or edited image signal of a photographed image.

In order to perform HDRI processing, the mobile terminal 100 collects a first image via the first camera 121_a and collects a second image via the second camera 121_b. The first camera 121_a and the second camera 121_b may be physically separated by a predetermined gap. For example, the predetermined gap between the first camera 121_a and the second camera 121_b may be 6 cm. An object photographed through each camera may appear differently because the cameras are not in the exact same location when capturing their respective images. In other words, each camera captures the image from a different view point.

Figure 4:
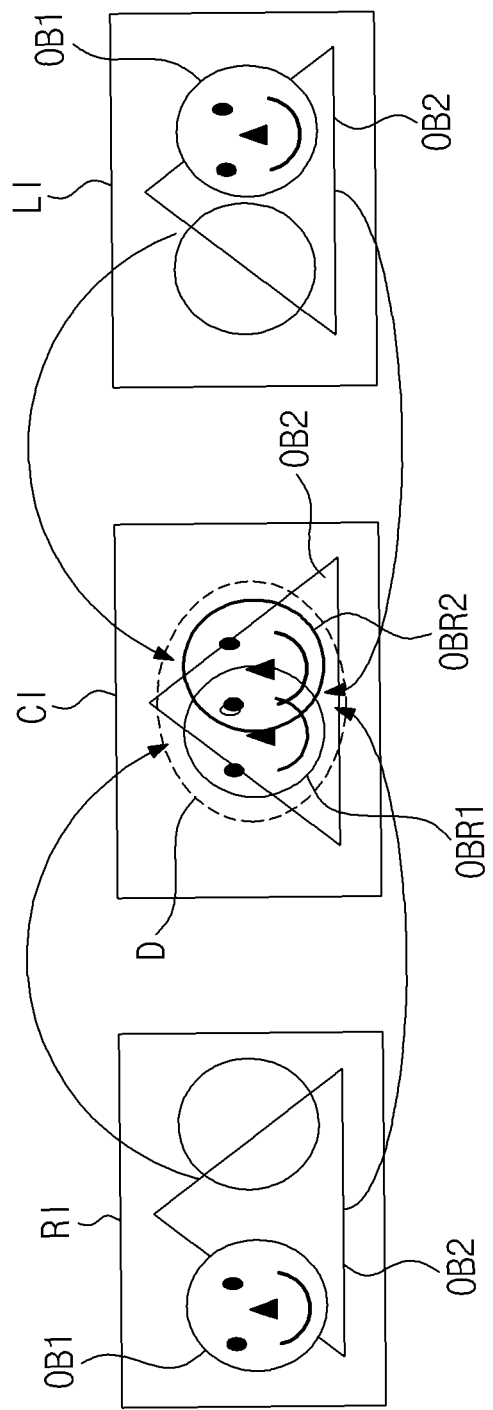
FIG. 4 illustrates an example of a ghost appearing on images captured using a dual camera when the captured images are synthesized together.

FIG. 4 illustrates an example of a ghost appearing on images captured using a dual camera when the captured images are synthesized together.

Referring to FIGS. 3 and 4, when the first camera 121_a is a left camera and the second camera 121_b is a right camera, a first image LI acquired through the first camera 121_a and a second image RI acquired through the second camera 121_b are overlapped and merged as a single image.

The first and second images photographed through the first and second cameras 121_a and 121_b, respectively, include both a near object OB1 and a far object OB2. The far object OB2 occupies the same position within the first image LI and the second image RI, but the near object OB1 occupies a different position in the first image LI and the second image RI. For example, the near object OB1 may appear to be more towards the right side of a left image LI as captured by the left camera 121_a; at the same time, the same near object OB1 may be appear to be more toward the left side of a right image RI as captured by the right camera 121_b.

The controller 180 generates a HDR image CI using the left image LI and the right image RI. When the left image LI and the right image RI are overlapped based on the far object OB2, or whenever any image is shifted to another image, the left image LI and the right image RI are matched one-to-one in the far object OB2; however, in the near object OB1, the left image LI and the right image RI are not matched one-to-one.

A disparity generated when synthesizing two images can be removed by a first image acquired being set as a reference image and a specific near object of a second image being shifted to the specific near object in the first image.

A hole generated by a shift of the specific near object can be processed and, by processing the hole, an HDR image can be generated using an image captured through the dual camera. Operations associated with generating an HDR image using an image captured through the dual camera will be described in greater detail below with reference to applicable drawings.

Figure 5:
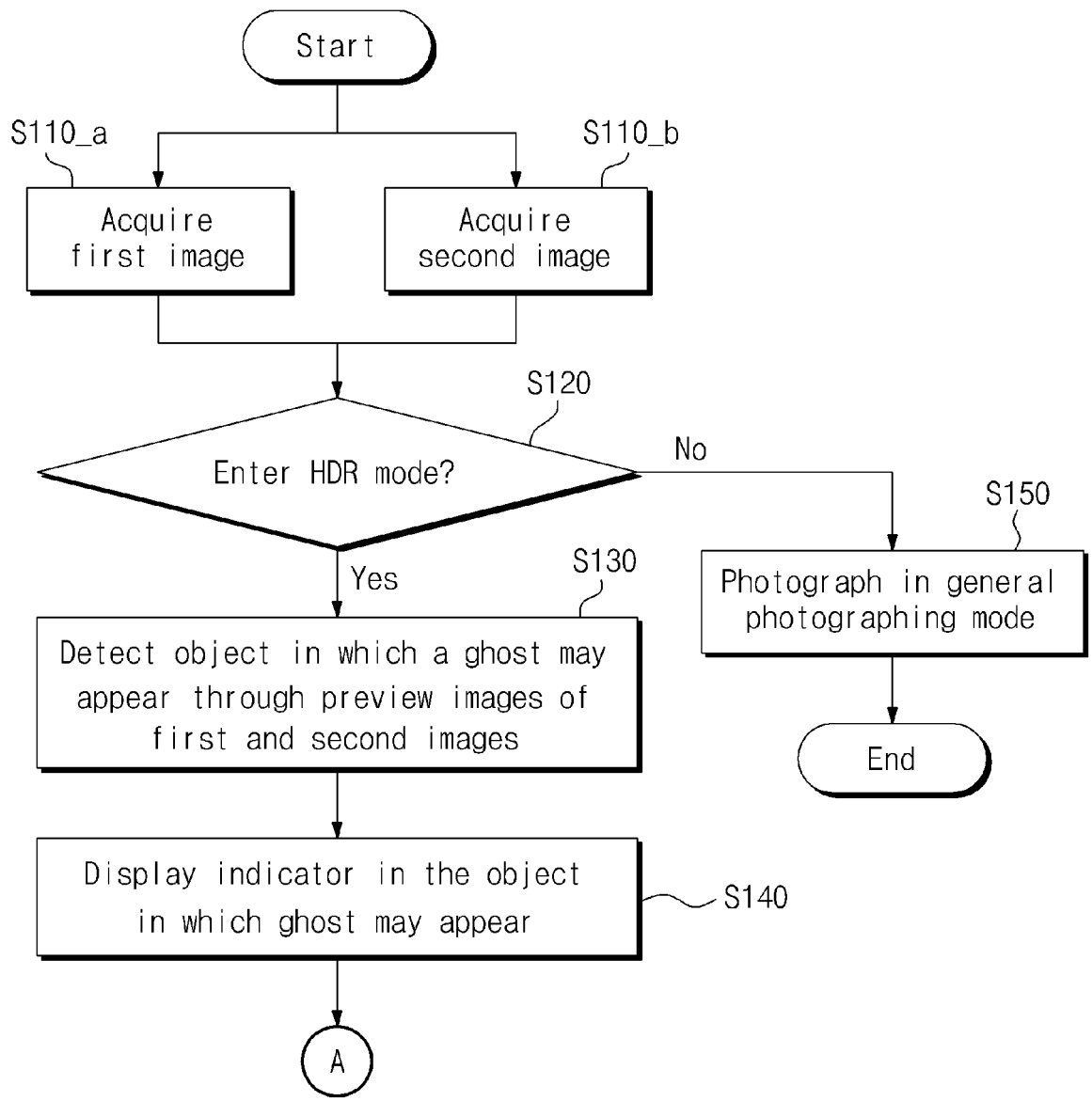
FIG. 5 illustrates a flowchart representing a method of controlling a mobile terminal according to an alternative embodiment of the claimed invention.

FIG. 5 illustrates a flowchart representing a method of controlling a mobile terminal according to an alternative embodiment of the claimed invention.

Figure 6:
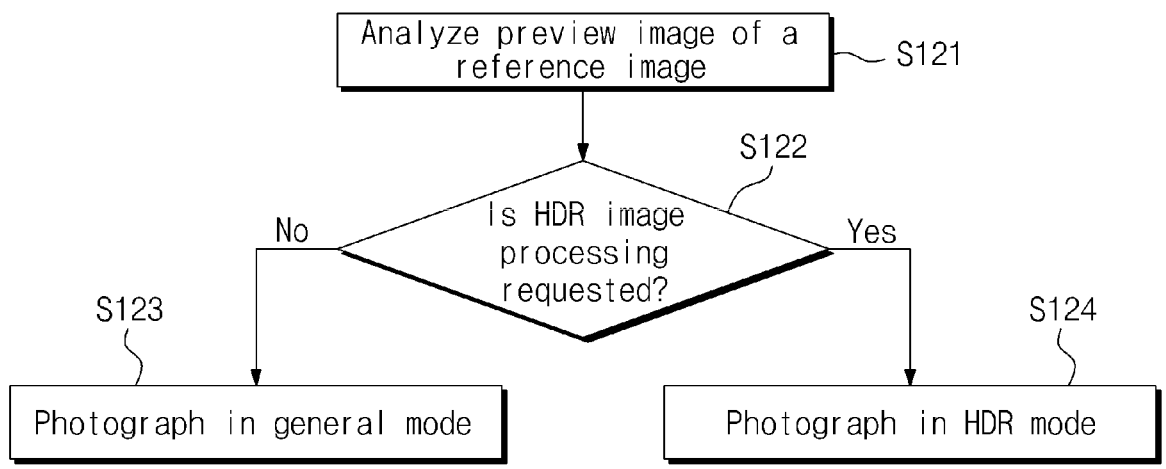
FIG. 6 illustrates a flowchart representing a method of setting a mobile terminal to an HDR mode.

Referring to FIGS. 5 and 6, the mobile terminal 100 acquires a first image through the first camera 121_a (S110_a) and acquires a second image through the second camera 121_b (S110_b).

The first camera 121_a and the second camera 121_b may be separated from each other by a predetermined gap. The predetermined gap may be about 6 cm.

The controller 180 of the mobile terminal 100 may set a different exposure time for the first camera 121_a and the second camera 121_b. For example, the controller 180 may set the first camera 121_a to over-expose an image and the second camera 121_b to under-expose an image.

An over-exposed first image captures more light relative to a non-over-exposed second image. An over-exposed first image generally can acquire more information about a short range object. An under-exposed second image captures less light relative to a non-under-exposed image, and the under-exposed second image can acquire more information about a shadow of an object.

As the first image and the second image are acquired, in order to process an HDR image, the controller 180 determines whether to enter an HDR mode or a general photographing mode (S120).

Referring to FIG. 6, the controller 180 sets the first image acquired through the first camera 121_a as a reference image and analyzes a preview image of the first image (S121) to determine whether HDR image processing is requested (S122). For example, when at least some area in the reference image includes an area saturated with a bright color, the controller determines that the reference image is an image where HDR image processing is requested. If the first image is an image in which HDR image processing is requested, the controller sets a camera photographing mode to an HDR mode (S124). If the first image is not an image where HDR image processing is requested, the controller sets a camera photographing mode to a general mode (S123).

The controller 180 may set different exposure times for the two cameras in the HDR mode. As described above, in order to photograph a subject and shadow of a background, one camera can set an exposure time to "−" and the other camera can set an exposure time to "+".

Referring again to FIG. 5, at step S120, if a camera photographing mode is in an HDR mode, the controller 180 generates a preview image of the acquired first image and the acquired second image and detects an object in which a ghost may appear (S130).

The controller 180 overlaps the preview images of the first image and the second image and detects an object having a disparity. When the two images are overlapped, there may exist a disparity between a far object (or a background) of the first image and a far object (or a background) of the second image. If a relative position of a near object of the first image and a near object of the second image are not matched one-to-one, the controller can determine that a disparity exists in the objects. As a distance between the mobile terminal 100 and the subject decreases, the disparity can increase.

The controller 180 determines whether an object comprising a ghost is detected by analyzing an image captured by the first camera and an image captured by the second camera. Thereafter, the controller 180 controls the display unit to display an indicator in the object in which the ghost may appear (S140).

In order to notify that an object requests HDR processing, an indicator is directly displayed on the detected object displayed on the preview image or, alternatively, a warning message window is generated and displayed on the display unit 151. A user can use such notifications to determine an object in which an HDR processing is necessary.

Figure 7:
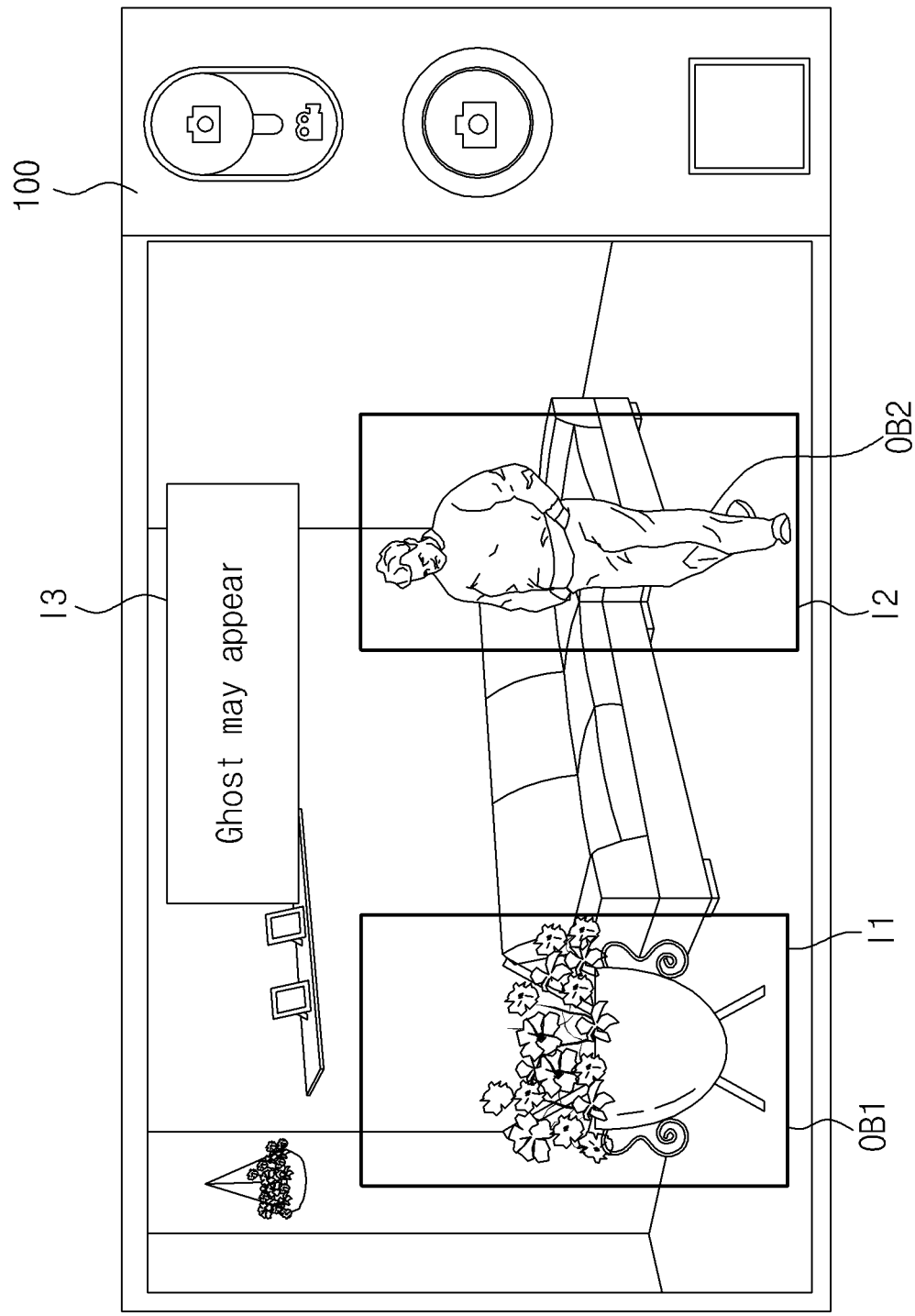
FIG. 7 illustrates a user interface providing notification that a ghost may appear on a preview image.

FIG. 7 illustrates a user interface providing notification about the possibility of a ghost appearing on the image.

Figure 8:
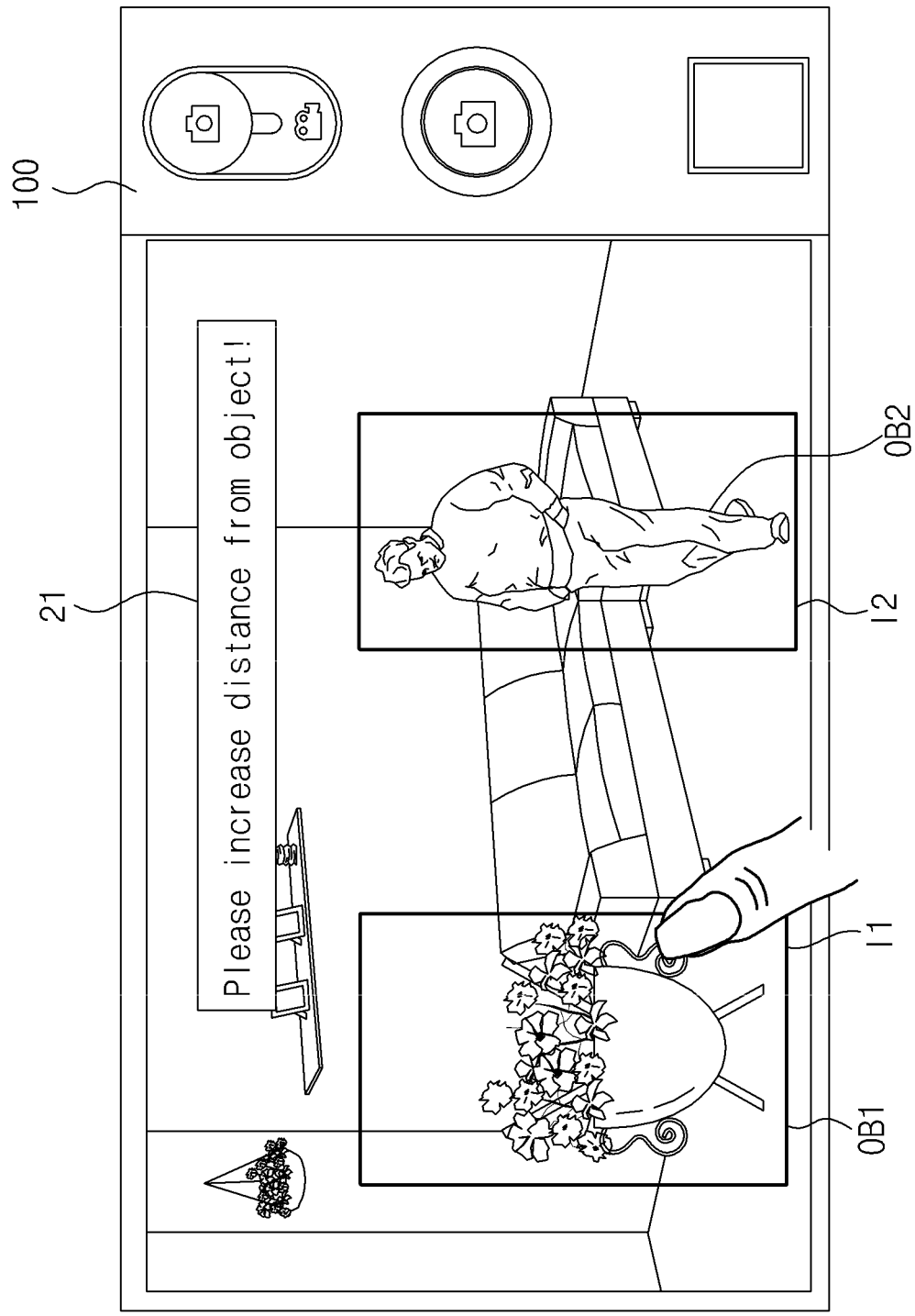
FIG. 8 illustrates a user interface providing notification to adjust a distance between the mobile terminal and a subject when a ghost may appear on a preview image.

FIG. 8 illustrates a user interface providing notification that adjusting a distance between the mobile terminal and a subject can avoid a ghost from appearing on the image.

Referring to FIG. 7, indicators 11 and 12 for identifying objects OB1 and OB2 are displayed by the display unit 151. Identifying objects OB1 and OB2 may require hole filling processing. A ghost may appear in a first preview image acquired by the first camera 121_a and a second preview image acquired by the second camera 121_b; the ghosts may be designated as objects OB1 and OB2.

The controller 180 may provide a warning message 13 notifying that a ghost may appear. The controller may also provide indications directly in the objects OB1 and OB2 when displayed in the display unit 151.

By providing an indicator that an object may be displayed with a ghost, a user can become aware that an object may require hole filling processing.

By providing an indication related to an object in which a ghost may appear, a user can select whether to perform image processing to remove the ghost or to proceed to capture an image despite the appearance of a ghost.

When a distance decreases between the mobile terminal 100 and a subject, the likelihood increases that a ghost will appear in an image acquired through a dual camera.

Referring to FIG. 8, when a distance increases between the mobile terminal 100 and a subject corresponding to the detected object, a user interface 21 is provided to notify the user to increase the distance between the camera 121 and the object.

In some embodiments, the controller 180 controls the display unit 151 to display an appropriate distance at which a ghost may no longer appear in a captured image.

Figure 9:
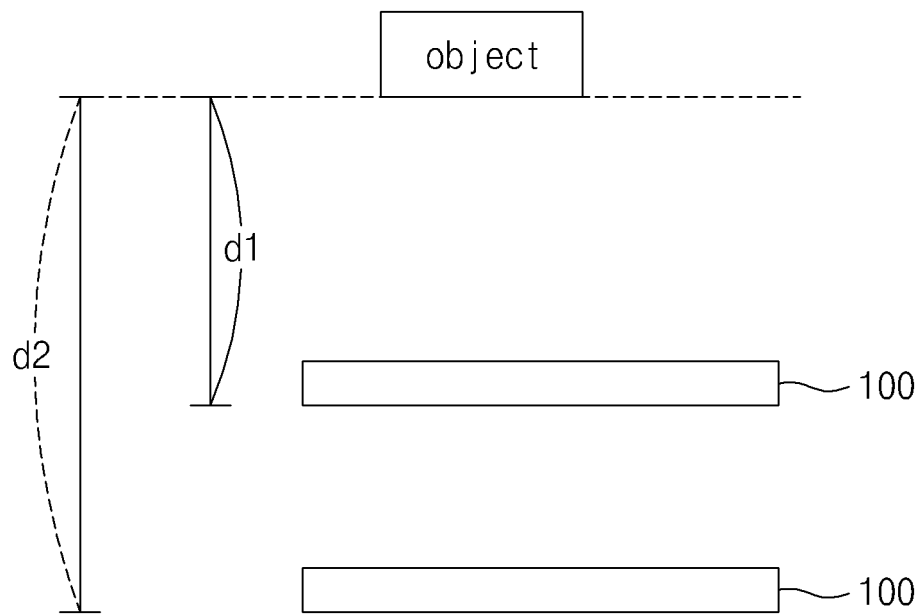
FIG. 9 illustrates that HDR processing can be adjusted according to a distance between the mobile terminal and the subject.

FIG. 9 illustrates that HDR processing can be adjusted according to a distance between the mobile terminal 100 and the subject.

FIG. 10 illustrates that a ghost may appear according to a distance between the mobile terminal 100 and the subject.

Referring to FIG. 9, reference numerals d1 and d2 represent distances between a camera 121 of the mobile terminal 100 and the subject being photographed.

At a side surface of the mobile terminal 100, when photography is performed using two cameras, a subject at a distance d1 has a relatively high probability of appearing as a ghost, and a subject at a distance d2 has a relatively low probability of appearing as a ghost.

Therefore, as a distance between the mobile terminal 100 and the subject changes, the likelihood of a ghost appearing also changes. Accordingly, the likelihood of an indicator indicating that a ghost may appear may also change.

For example, when a distance between the mobile terminal 100 and the subject is d1, a ghost generates in both object OB1 and the object OB2. Accordingly, the controller 180 can control the display unit to display indicators in both object OB1 and object OB2.

However, when a distance between the mobile terminal 100 and the subject increases to d2, a ghost may not appear in the object OB1. Accordingly, the controller 180 can control the display unit to no longer display the indicator of object OB1. However, because a ghost still generates in the object OB2, the controller 180 controls the display unit to maintain the display of the indicator of the object OB2.

Figure 11:
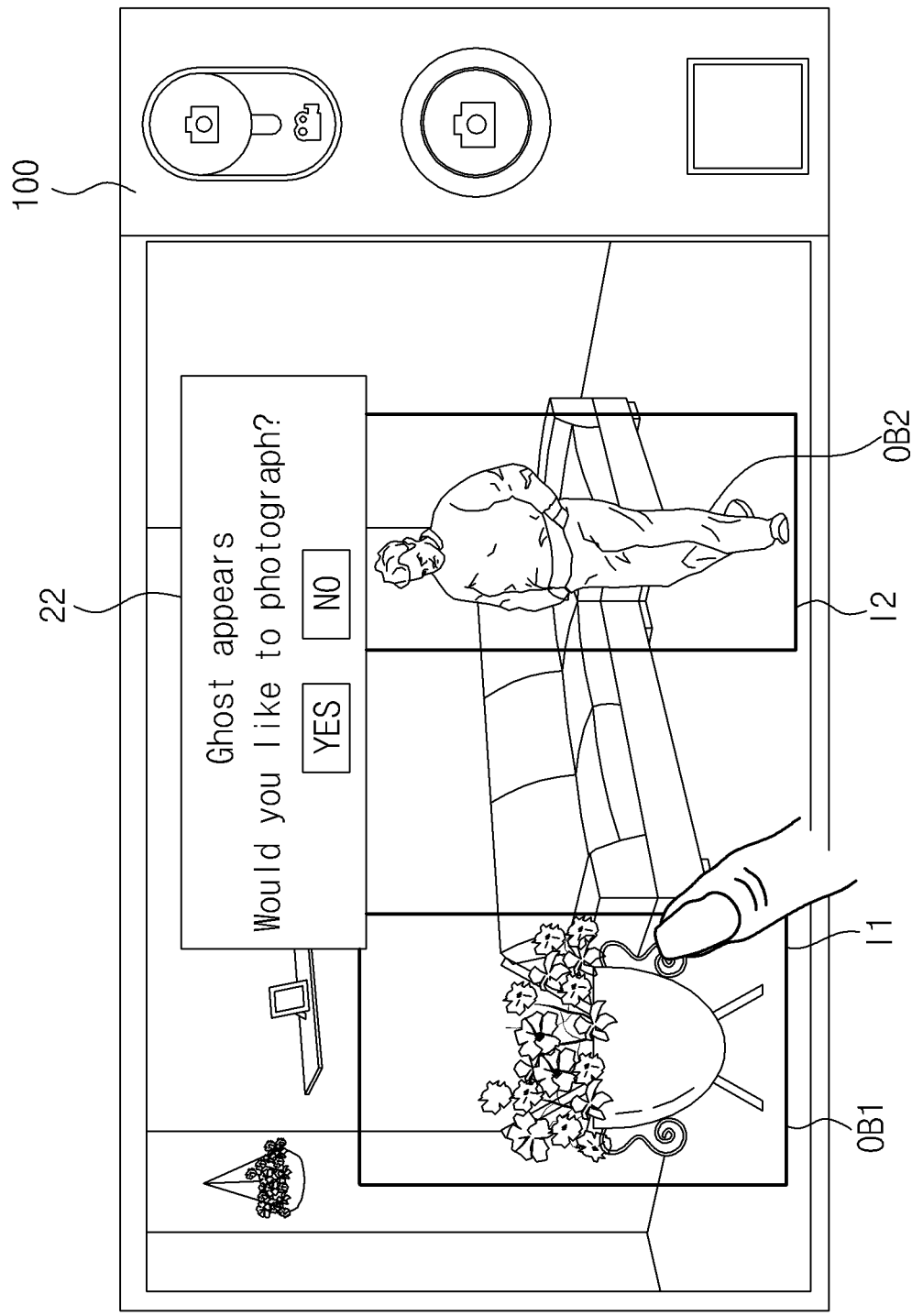
FIG. 11 illustrates a user interface providing notification that a hole filling process can be performed on an image that may otherwise contain a ghost.

FIG. 11 illustrates an example of a user interface notifying that a HDR processing can be performed by a user selection when an object in which a HDR processing is requested exists.

Referring to FIG. 11, when the mobile terminal 100 enters an HDR mode, even if an object may contain a ghost, a process of processing the ghost (i.e., hole filling processing) may not be performed through a preview image. That is, the mobile terminal 100 may generate the ghost, but the ghost may not be recognized by a user's visual sense.

In a process of acquiring an HDR image, the controller 180 provides a user interface 22 on display unit 151 for indicating that a ghost appears and inquiring whether to capture the photograph (22).

In the foregoing exemplary embodiment of the mobile terminal environment having a dual camera, at least the following is provided: operations of determining whether HDR processing is requested based on a preview image acquired through any one camera of the dual camera; detecting an object in which a ghost may appear based on a first and second preview images; and notifying a user about the possibility of a ghost appearing to allow for the option of HDR processing.

Described herein is a process of generating an HDR image from a detected object in which a ghost may appear.

Figure 12:
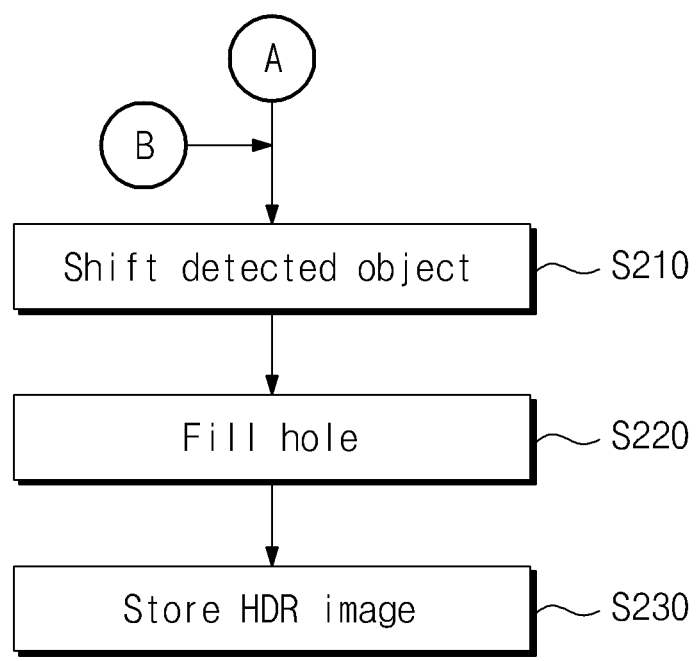
FIGS. 12 to 14 are flowcharts illustrating a method of performing the hole filling processing.
Figure 13:
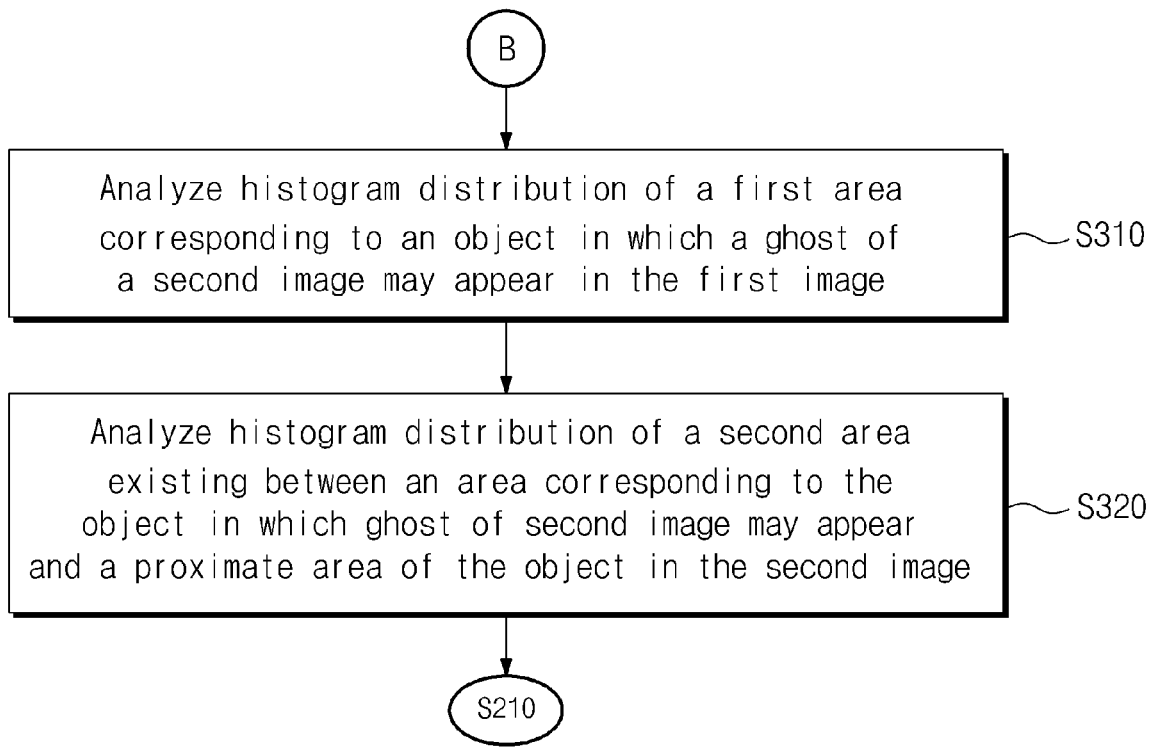
Figure 14:
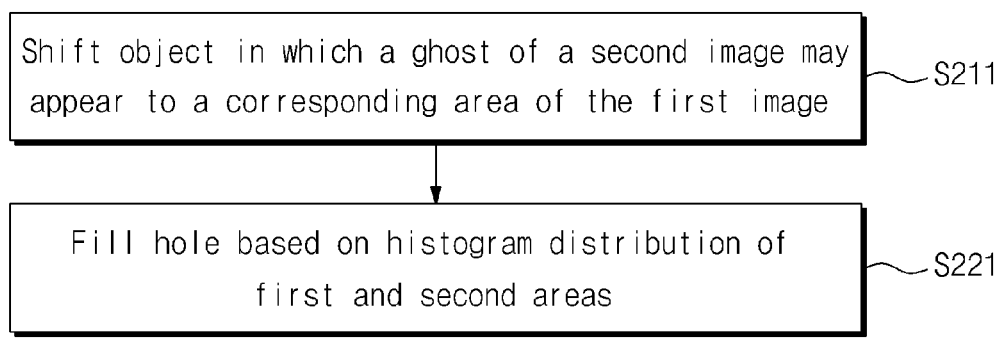
Figure 15:
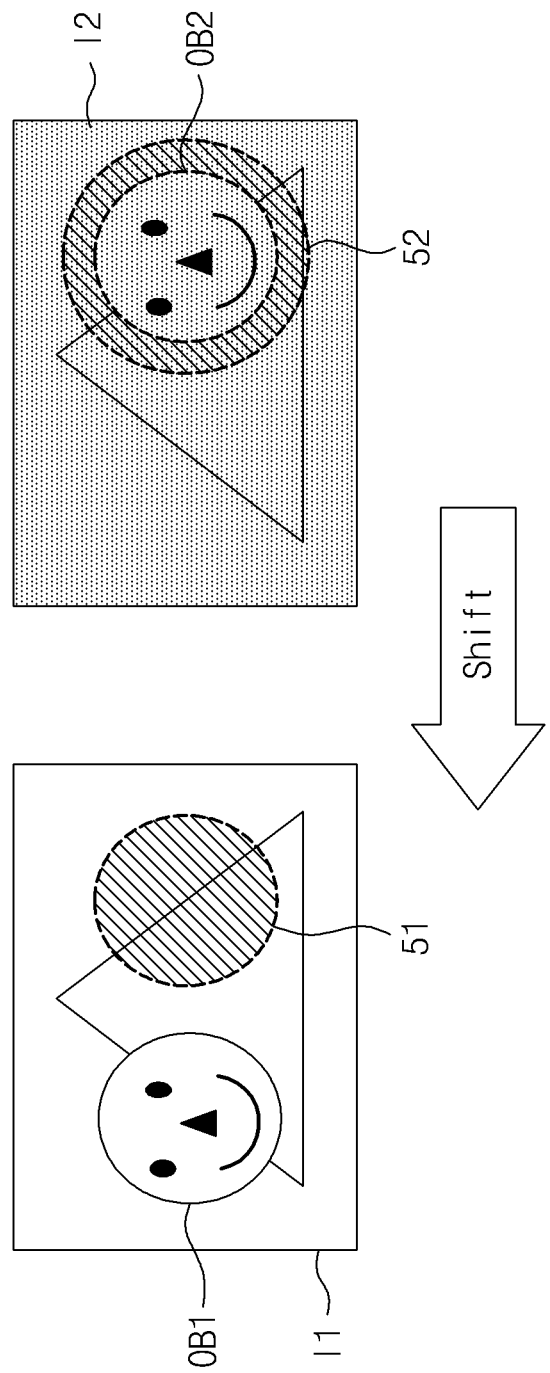
FIGS. 15 to 17 are illustrations corresponding to the method of performing hole filling processing as depicted in FIGS. 12 to 14.
Figure 16:
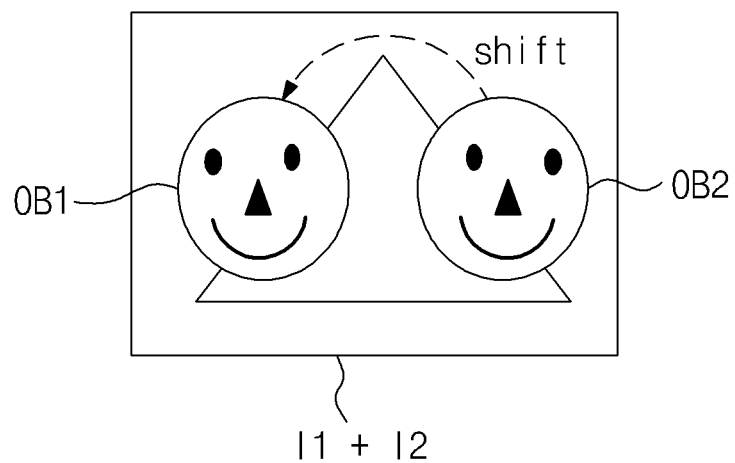
Figure 17:
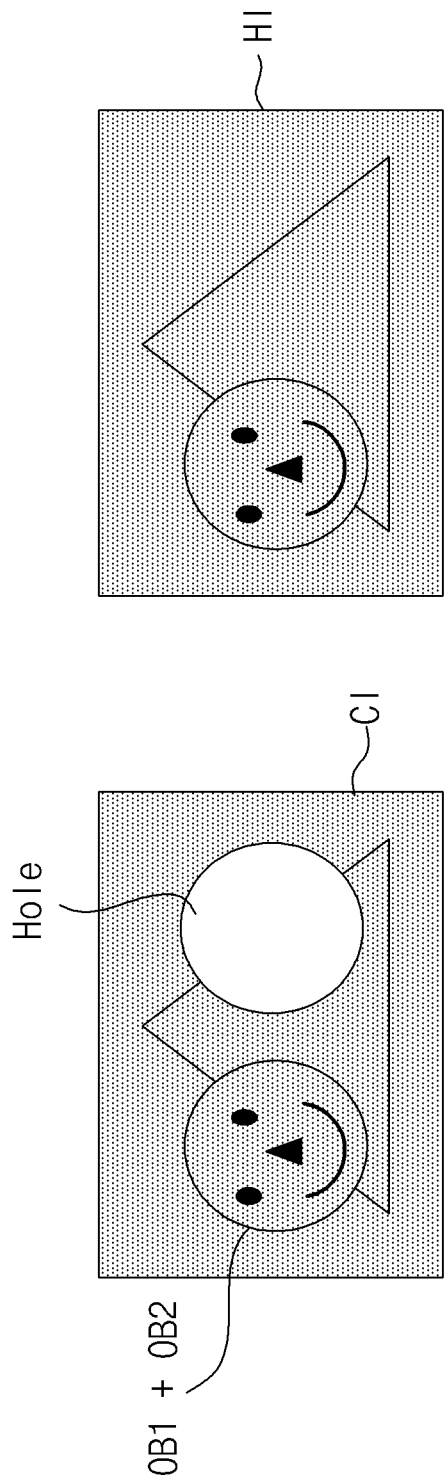

FIGS. 12 to 14 are flowcharts illustrating a method of performing the hole filling processing. FIGS. 15 to 17 are illustrations corresponding to the method of performing hole filling processing as depicted in FIGS. 12 to 14.

Referring to FIG. 12, the controller 180 of the mobile terminal 100 shifts an object in which a ghost may appear. An object in which a ghost may generate in a first image is assumed to be a first object, and an object in which a ghost may appear in a second image is assumed to be a second object.

Upon inputs A and B, a shift detected object is determined (S210). The hold is filled (S220), and the HDR image is stored (S230).

The first object and the second object may consist of images in which the same subject is viewed via the first image and the second image, respectively.

When an image acquired through the first camera is assumed to be a reference image (e.g., see FIG. 16) and the first image and the second image are overlapped, the first object (OB1 of FIG. 16) and the second object (OB2 of FIG. 16) are substantially the same subject. It can sometimes be necessary to correct an image to correspond to a reference image. The controller 180 can set an exposure time of the first camera to be longer than that of the second camera. The controller 180 can also set a brightness of the first image to be brighter than that of the second image.

When synthesizing and editing the first image and the second image, histogram distribution of each image can be used.

FIG. 13 is a flowchart illustrating a method of processing an object in which a ghost may appear. Referring to FIG. 13, the controller 180 can analyze histogram distributions of the first and second images.

The controller 180 can analyze histogram distribution of a first area corresponding to an object and in which a ghost of the second image may appear in the first image (S310). The controller can also analyze histogram distribution of a second area existing between an area corresponding to an object in which a ghost of the second image may appear and a proximate area of the object in the second image (S320). A hole may be created due to an object shift.

Referring to FIG. 14, the controller 180 shifts an object in which a ghost of the second image may appear to a corresponding area of the first image (S211). The controller can fill a hole generated by the shift (S221). In more detail, the controller 180 fills the hole based on histogram distribution of the first and second areas. A process of filling the hole is described in more detail with reference to FIG. 15.

Referring to FIG. 15, the controller 180 analyzes histogram distribution of the first area 51 in a first image (i.e., a reference image) 11 corresponding to an object in which a ghost of a second image 12 may appear (S310).

The controller 180 can also analyze the histogram distribution of a second area 52 existing between an area (area occupied by OB2) corresponding to an object OB2 in which a ghost of the second image 12 may appear and a proximate area of the object in the second image 12 (S320).

A reason for analyzing the histogram distribution of the second area 52 is to allow at least different exposure times or different brightness for the first image 11 and the second image 12. Another reason for analyzing the histogram distribution of the second area 52 is determine its similarity relative to the histogram distribution of a hole generated by the shift when the first image 11 and the second image 12 are overlapped and the second object OB2 is shifted to the first object OB1.

FIG. 16 illustrates an example in which the first image and the second image are overlapped. Referring to FIG. 16, the controller 180 can overlap the first object OB1 and the second object OB2 based on a far object 60 or a background. Accordingly, the first object OB1 and the second object OB2 may exist in one image I1 and I2 (I1+I2). Thereafter, the second object OB2 can be shifted to the first object OB1.

A hole can be shifted, as shown in FIG. 17. The controller 180 fills a hole generated with reference to the histogram distribution of the first image and the histogram distribution of the second image, as described with reference to FIG. 13.

The above-described method of controlling a mobile terminal according to the present invention may be written and provided in a computer readable recording medium with a program executable in a computer.

The method of controlling the mobile terminal according to the present invention may be executed through software. When executed by software, constituent means of the present invention are code segments that perform required tasks. Programs or code segments may be stored in a processor readable medium or may be transmitted by a computer data signal combined with a carrier through a transmission medium or a communication network.

The computer readable recording medium may be any data storage device configured for storing data that can be read by a computer system. The computer readable recording medium may include, for example, a read-only memory (ROM), a random-access memory (RAM), a CD-ROM, a DVD±ROM, a DVD-RAM, a magnetic tape, a floppy disk, a hard disk, or an optical data storage device. The computer readable recording medium may also be distributed in a computer system connected to a network and, thus, a computer readable code may be stored and executed in a distributed manner.

The foregoing embodiments and features are merely exemplary in nature and are not to be construed as limiting the claimed invention. The disclosed embodiments and features may be readily applied to other types of apparatuses. The description of the foregoing embodiments is intended to be illustrative and not to limit the scope of the claims. Many alternatives, modifications, and variations will be apparent to those skilled in the relevant art.

What is claimed is:

1. A mobile terminal comprising:
   a display unit;
   a first camera configured to acquire a first image from a first view point;
   a second camera configured to acquire a second image from a second view point that is different from the first view point; and
   a controller configured to:
     detect at least one object comprising a ghost in preview images of the first or second images,
     control the display unit to display an indicator corresponding to the detected at least one object, and
     determine whether a user requests high dynamic range (HDR) image processing on the detected at least one object.

2. The mobile terminal of claim 1, wherein the controller is further configured to:
   switch from a photographing mode to an HDR operating mode when the preview image of the first image comprises at least one saturation area.

3. The mobile terminal of claim 1, wherein the controller is further configured to:
   detect the at least one object when a disparity exists between overlapped preview images of the first and second images.

4. The mobile terminal of claim 1, wherein the indicator comprises at least a highlight or a text message.

5. The mobile terminal of claim 1, wherein the controller is further configured to:
   detect selection of the detected at least one object; and
   control the display unit to display information about the detected at least one object according to a distance between the mobile terminal and the detected at least one object in response to the selection of the detected at least one object.

6. The mobile terminal of claim 3, wherein the controller is further configured to:
   control the display unit to display a user selection menu that inquires whether to capture a video or an image in response to the selection of the detected at least one object.

7. The mobile terminal of claim 3, wherein the controller is further configured to:
   re-detect the at least one object comprising the ghost in the preview images of the first or second images; and
   control the display unit to display an indicator corresponding to the re-detected at least one object when a distance between the mobile terminal and the re-detected at least one object is changed.

8. The mobile terminal of claim 1, wherein:
   the first camera is set to over-expose the first image, and
   the second camera is set to under-expose the second image.

9. The mobile terminal of claim 8, wherein the controller is further configured to:
   overlap background images of the first and second images; and
   apply histogram distribution analysis results from the first and second images to a hole when the detected at least one object in the second image is shifted to a corresponding area in the first image.

10. The mobile terminal of claim 9, wherein the controller is further configured to:
    analyze a histogram distribution of a first area, the first area corresponding to the at least one object in the first image;
    analyze a histogram distribution of a second area, the second area corresponding to an area proximate to the first area; and
    change the histogram distribution of the first area with reference to the histogram distribution of the second area.

11. A method of controlling a mobile terminal, the method comprising:
    acquiring a first image by a first camera from a first view point;
    acquiring a second image by a second camera from a second view point that is different from the first view point;
    entering a high dynamic range (HDR) operating mode;
    detecting at least one object comprising a ghost in preview images of the first or second images; and
    displaying an indicator corresponding to the detected at least one object.

12. The method of claim 11, further comprising:
    analyzing a histogram distribution of a first area, the first area corresponding to the at least one object in the first image;
    analyzing a histogram distribution of a second area, the second area corresponding to an area proximate to the first area; and
    overlapping the first and the second images;
    shifting the detected at least one object from the second image to a corresponding area of the first image; and
    changing the histogram distribution of the first area with reference to the histogram distribution of the second area.

13. The method of claim 11, further comprising:
switching from a photographing mode to an HDR operating mode when a preview image of the first image comprises at least one saturation area.

14. The method of claim 11, further comprising:
detecting the at least one object when a disparity exists between overlapped preview images of the first and second images.

15. The method of claim 11, wherein the indicator comprises at least a highlight or a text message.

16. The method of claim 11, further comprising:
detecting selection of the detected at least one object; and
controlling a display unit to display information about the detected at least one object according to a distance between the mobile terminal and the detected at least one object in response to the selection of the detected at least one object.

17. The method of claim 14, further comprising:
controlling a display unit to display a user selection menu that inquires whether to capture a video or an image in response to the selection of the detected at least one object.

18. The method of claim 14, further comprising:
re-detecting the at least one object comprising the ghost in the preview images of the first or second images; and
controlling the display unit to display an indicator corresponding to the re-detected at least one object when a distance between the mobile terminal and the re-detected at least one object is changed.

19. The method of claim 11, wherein:
the first camera is set to over-expose the first image, and
the second camera is set to under-expose the second image.

20. The method of claim 11, further comprising:
overlapping background images of the first and second images; and
applying histogram distribution analysis results from the first and second images to a hole when the detected at least one object in the second image is shifted to a corresponding area in the first image.

* * * * *